United States Patent [19]

Aiken et al.

[11] Patent Number: 5,769,720
[45] Date of Patent: Jun. 23, 1998

[54] ANTI-ROTATION BEARING CAP AND RETAINER FOR UNIVERSAL JOINT

[75] Inventors: Albert Aiken; Johnny N. Smith, both of Toledo, Ohio

[73] Assignee: Dana Corporation, Toledo, Ohio

[21] Appl. No.: 609,656

[22] Filed: Mar. 1, 1996

Related U.S. Application Data

[63] Continuation-in-part of Ser. No. 490,788, Jun. 15, 1995, Pat. No. 5,647,799.

[51] Int. Cl.[6] .................................................. F16O 3/40
[52] U.S. Cl. ........................................... 464/128; 464/135
[58] Field of Search ................................... 464/128, 130, 464/134, 136

[56] References Cited

U.S. PATENT DOCUMENTS

| | | | |
|---|---|---|---|
| 768,200 | 8/1904 | Speirs et al. . | |
| 1,552,358 | 9/1925 | Thiemer | 464/134 X |
| 1,989,832 | 2/1935 | Swenson | 464/130 |
| 2,036,977 | 4/1936 | Anderson | 464/130 |
| 2,114,861 | 5/1938 | Slaght | 464/130 |
| 2,273,920 | 2/1942 | Anderson | 464/130 |
| 2,299,001 | 10/1942 | Anderson . | |
| 2,300,658 | 11/1942 | Dunn . | |
| 2,698,527 | 1/1955 | Anderson | 464/130 |
| 3,045,455 | 7/1962 | Potgieter | 464/134 |
| 4,575,361 | 3/1986 | Thatcher . | |
| 4,861,314 | 8/1989 | Mazziotti . | |
| 5,376,051 | 12/1994 | Valencic | 464/130 |

FOREIGN PATENT DOCUMENTS

| | | | |
|---|---|---|---|
| 1156043 | 5/1958 | France | 464/132 |
| 3527053 | 2/1986 | Germany | 464/130 |
| 545830 | 9/1957 | Italy | 464/130 |
| 59-166717 | 9/1984 | Japan . | |
| 1493132 | 11/1977 | United Kingdom . | |

*Primary Examiner*—Eileen A. Dunn
*Attorney, Agent, or Firm*—MacMillan, Sobanski & Todd

[57] ABSTRACT

A universal joint assembly includes a yoke having a recess formed in an arm. A bearing cap is rotatably mounted on a trunnion of a cross and received in the recess of the yoke arm. The bearing cap includes an outer circumferential surface engaging the recess, an end surface and at least one axially extending protrusion formed in the end surface. A retainer strap is secured to the yoke arm to retain the bearing cap in the recess. A slot is formed in the retainer strap which receives the protrusion of the bearing cap to prevent rotation of the bearing cap relative to the yoke.

14 Claims, 6 Drawing Sheets

5,769,720

ANTI-ROTATION BEARING CAP AND RETAINER FOR UNIVERSAL JOINT

CROSS REFERENCE TO RELATED APPLICATION

This application is a continuation-in-part of Ser. No. 08/490,788 filed Jun. 15, 1995 now U.S. Pat. No. 5,647,700.

BACKGROUND OF THE INVENTION

This invention relates in general to universal joints for vehicle drive train systems. More specifically, this invention relates to an improved structure for preventing relative rotational movement between a bearing cap mounted on a cross and an end yoke of a universal joint assembly.

Universal joints are well known devices which provide a driving connection between two members adapted to rotate about non-aligned axes of rotation. Universal joints are widely used between rotatable drive shaft sections in vehicle drive train systems. A typical universal joint structure includes a cross having a central body portion with four cylindrical trunnions extending outwardly therefrom. The trunnions are oriented in a single plane and extend at right angles relative to one another. A hollow cylindrical bearing cap is mounted on the end of each of the trunnions. Needle bearings or similar means are provided between the outer cylindrical surfaces of the trunnions and the inner cylindrical surfaces of the bearing caps to permit relative rotational movement therebetween. The bearing caps which are mounted on a first opposed pair of the trunnions can be connected to a first end yoke secured to an end of a first drive shaft section, while the bearing caps mounted on a second opposed pair of the trunnions can be connected to a second end yoke secured to an end of a second drive shaft section.

During operation, the first and second drive shaft sections, as well as the universal joint connected therebetween, rotate as a unit. If the axes of rotation of the first and second drive shaft sections are co-axially aligned, then no angular movement occurs between the either of the end yokes and the universal joint cross. Thus, the bearing caps remain stationary (i.e., do not rotate) relative to the trunnions upon which they are mounted as the entire unit rotates. However, when the axes of rotation of the first and second drive shaft sections are not co-axially aligned, a small amount of oscillating rotational movement occurs between each of the end yokes and the universal joint cross. Inasmuch as the bearings caps are connected to the end yokes, the bearing caps will rotate a small amount back and forth relative to the trunnions upon which they are mounted. When this oscillating movement occurs, it is desirable that the bearing caps be positively restrained from rotating relative to the end yokes, so that all relative rotational movement occurs between the bearing caps and the trunnions upon which they are mounted. Relative movement between the bearing caps and the end yokes can result in wear on the respective engaging surfaces, possibly resulting in undesirable looseness in the driving connection therebetween and premature failure of the universal joint. These problems can be especially pronounced when the drive shafts and universal joints are relatively large in size and are subjected to relatively heavy loads, such as might be encountered in heavy duty trucks.

Several structures are known in the art for preventing relative rotation between the bearing caps and the end yokes. For example, it is known to weld plates onto the end surfaces of the bearing caps and to bolt such plates to the end yokes. However, this structure, as well as other known anti-rotation structures, requires extra parts and additional labor to install. Consequently, these known structures undesirably increase the cost and complexity of the universal joint. Accordingly, it would be desirable to provide an improved anti-rotation structure for a universal joint which is simple and inexpensive to construct and assemble, and further which is particularly well suited for physically large drive shafts which are subjected to heavy loads.

SUMMARY OF THE INVENTION

This invention relates to an improved structure for restraining a bearing cap mounted on a universal joint cross from rotating relative to a half round end yoke during use. The improved structure prevents the occurrence of wear in the semi-cylindrical recess of the half round end yoke, thereby eliminating a source of failure of such a universal joint. The improved structure is simple and inexpensive to construct and assemble, and is suitable for large drive shafts subjected to heavy loads.

In a preferred embodiment, a universal joint assembly includes a yoke having a recess formed in an arm. A bearing cap is rotatably mounted on a trunnion of a cross and received in the recess of the yoke arm. The bearing cap includes an outer circumferential surface engaging the recess, an end surface and at least one axially extending protrusion formed in the end surface. A retainer strap is secured to the yoke arm to retain the bearing cap in the recess. A slot is formed in the retainer strap which receives the protrusion of the bearing cap to prevent rotation of the bearing cap relative to the yoke.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figures 1, 2:
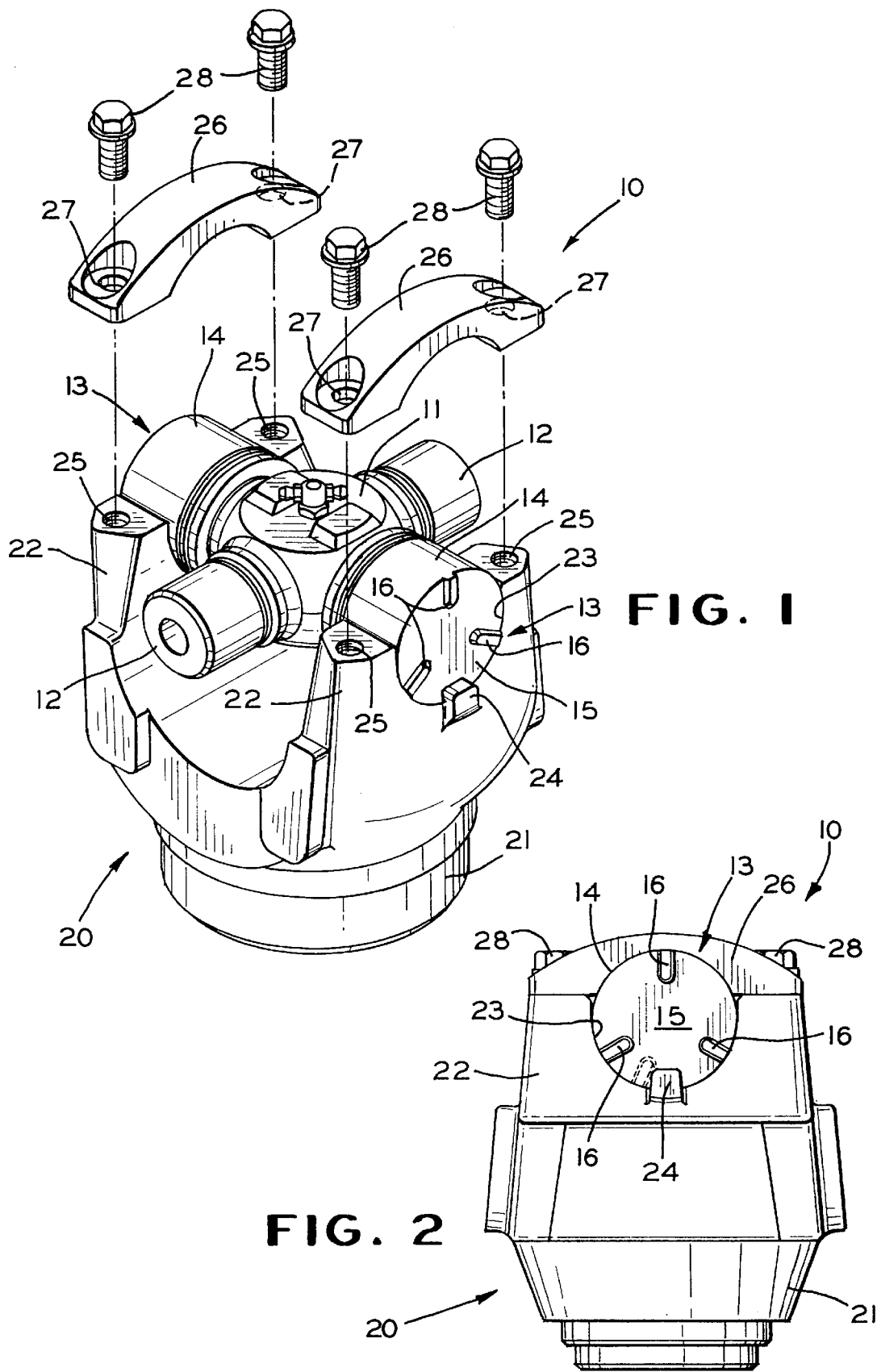
FIG. 1 is an exploded perspective view of a first embodiment of a universal joint assembly in accordance with this invention, including a half round end yoke having an integral nib and a pair of retainer straps.
FIG. 2 is a top plan view of the universal joint assembly illustrated in FIG. 1 shown assembled.

Referring now to the drawings, there is illustrated in FIGS. 1 and 2 a first embodiment of a universal joint assembly, indicated generally at 10, in accordance with this invention. The universal joint assembly 10 includes a conventional cross 11 having four cylindrical trunnions 12 extending radially outwardly in a common plane at right angles relative to one another. A bearing cap, indicated generally at 13, is mounted on the end of each of the trunnions 12. Only one opposed pair of the bearing caps 13 is illustrated in FIG. 1. Needle bearings (not shown) or similar bearing means are provided between each of the bearing caps 13 and its associated trunnion 12 to permit low friction rotational movement to occur therebetween.

Figure 3:
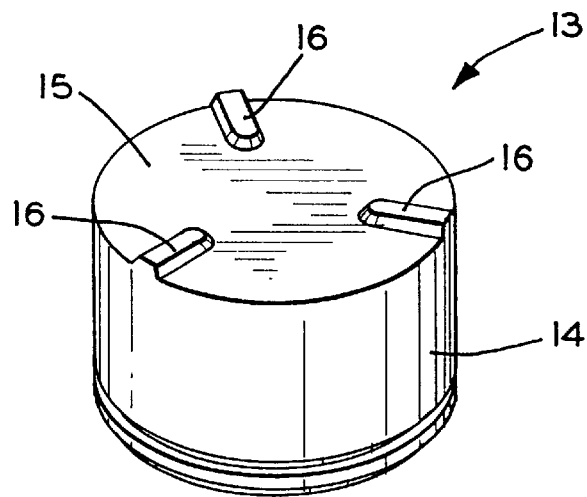
FIG. 3 is a perspective view of one of the bearing caps illustrated in FIGS. 1 and 2.
Figure 4:
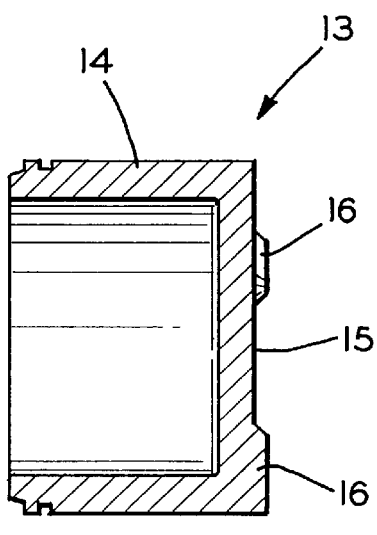
FIG. 4 is a sectional elevational view of the bearing cap illustrated in FIG. 3.
Figure 5:
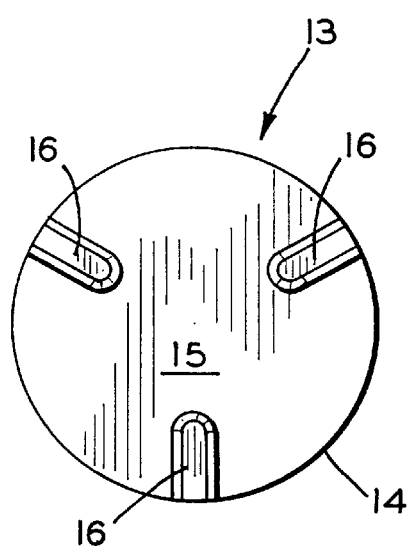
FIG. 5 is a top plan view of the bearing cap illustrated in FIG. 3.

The structure of one of the bearing caps 13 is more clearly illustrated in FIGS. 3, 4, and 5. As shown therein, each of the bearing caps 13 is generally hollow and cylindrical in shape, having an outer circumferential surface 14 and a closed end surface 15. Each of the bearing caps 13 has a plurality of axially extending protrusions 16 formed on the end surface 15 thereof. Preferably, each protrusion 16 extends axially from an end surface 15 away from an associated trunnion 12. Preferably, the protrusions 16 are formed integrally with the end surfaces 15 of the bearing caps 13. However, the protrusions 16 can also be formed as separate pieces that protrude from the end surfaces 15. For example, the protrusions 16 may be embodied as metal pins inserted through openings formed through the end surfaces 15 so as to protrude therefrom. Alternatively, the protrusions 16 may be embodied as nylon patches which are adhered to the end surfaces 15. The protrusions 16 can be formed having any desired shape. The bearing caps 13 and the protrusions 16 can be formed of any conventional material and by any conventional method. In the illustrated embodiment, three protrusions 16 are provided on the end surface 15 of each bearing cap 13. However, as will be explained in greater detail below, a greater or lesser number of protrusions 16 may be provided on the end surface 15 of the bearing cap 13. Indeed, a single protrusion 16 can be provided if desired.

The universal joint assembly 10 illustrated in FIGS. 1 and 2 further includes a half round end yoke, indicated generally at 20. The half round end yoke 20 includes a body portion 21 having a pair of opposed arms 22 extending therefrom. Each of the opposed arms 22 has a semi-cylindrical recess 23 formed in the end thereof. A pair of nibs 24 (only one is shown) is formed integrally on the half round end yoke 20, one on each of the arms 22. The nibs 24 are located at the centers of the semi-cylindrical recesses 23 and extend partially inwardly thereof. Each of the opposed arms 22 terminates in a pair of threaded apertures 25. When the cross 11 is assembled with the half round end yoke 20, two opposed bearing caps 13 are received in the semi-cylindrical recesses 23, as shown in FIGS. 1 and 2. In this position, the nibs 24 abut the end surfaces 15 of the bearing caps 13 to restrain them from moving axially off of the trunnions 12.

A pair of retainer straps 26 are provided for retaining the opposed bearing caps 13 within the semi-cylindrical recesses 23 of the end yoke 20. The central portions of the retainer straps 26 are curved and extend partially about the outer circumferential surfaces 14 of the opposed bearing caps 13. Each of the retainer straps 26 terminates in a pair of opposed end portions having non-threaded apertures 27 formed therethrough. Threaded fasteners 28 extend through the non-threaded apertures 27 into engagement with the threaded apertures 25 to secure the retainer straps 26 to the opposed arms 22 of the half round end yoke 20. As a result, the opposed bearing caps 13 are retained within the semi-cylindrical recesses 23 of the half round end yoke 20, trapped between the nibs 24.

Obviously, there is some frictional engagement between each of the bearing caps 13 and the associated arms 22 of the end yoke 20. Such frictional engagement is not, of itself, sufficient to prevent relative rotation between the bearing caps 13 and the end yokes 22 under all conditions. If such relative rotation occurs, one of the protrusions 16 will be moved into abutting engagement with the nib 24, as shown in dotted lines in FIG. 2. The nibs 24, therefore, provide positive stops which engage respective ones of the protrusions 16 formed on the end surfaces 15 of the opposed bearing caps 13 if relative rotation occurs. The engagement of each nib 24 with the associated protrusion 16 positively prevents rotation of the bearing cap 13 relative to the end yoke 20 when the universal joint 10 and end yoke 20 are rotated during use. As discussed above, the prevention of such relative rotation reduces wear in the outer circumferential surface of the bearing cap 13 and in the semi-cylindrical recess 23 of the half round end yoke 20.

Figure 6:
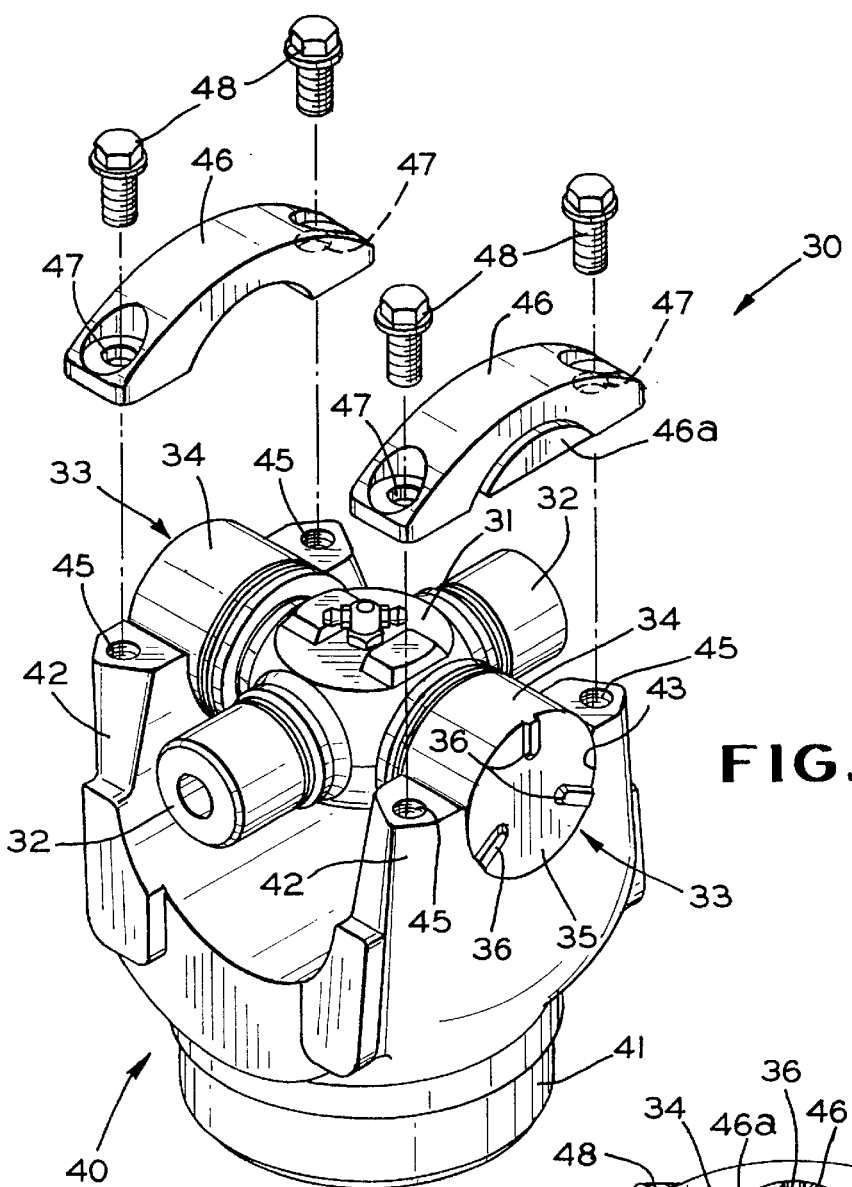
FIG. 6 is an exploded perspective view of a second embodiment of a universal joint assembly in accordance with this invention, including a half round end yoke having a pair of modified retainer straps.
Figure 7:
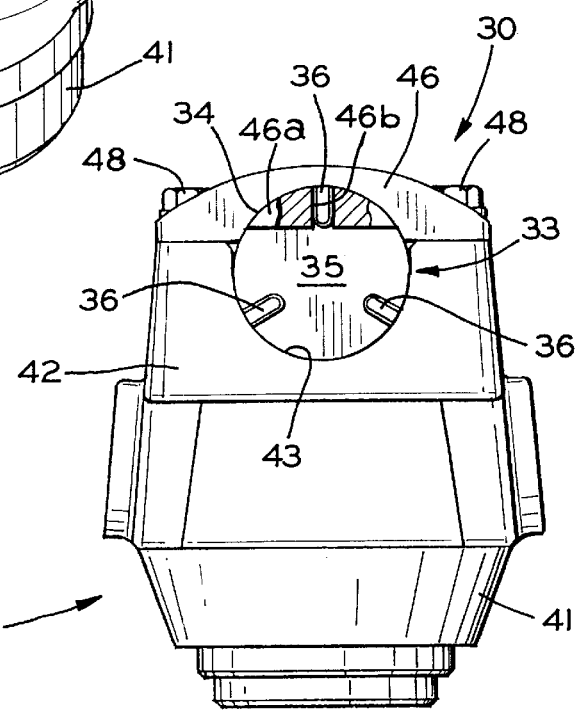
FIG. 7 is a top plan view of the universal joint assembly illustrated in FIG. 6 shown assembled.

Referring now to FIGS. 6 and 7, a second embodiment of a universal joint assembly, indicated generally at 30, in accordance with this invention is illustrated. The universal joint assembly 30 includes a conventional cross 31 having four cylindrical trunnions 32 extending radially outwardly in a common plane at right angles relative to one another. A bearing cap, indicated generally at 33, is mounted on the end of each of the trunnions 32. Only one opposed pair of the bearing caps 33 is illustrated in FIG. 6. Needle bearings (not shown) or similar bearing means are provided between each of the bearing caps 33 and its associated trunnion 32 to permit low friction rotational movement to occur therebetween. The bearing caps 33 are identical in structure to the bearing caps 13 described above, each including an outer circumferential surface 34, a closed end surface 35, and a plurality of axially extending protrusions 36.

The universal joint assembly 30 illustrated in FIGS. 6 and 7 further includes a half round end yoke, indicated generally at 40. The half round end yoke 40 includes a body portion 41 having a pair of opposed arms 42 extending therefrom. Each of the opposed arms 42 has a semi-cylindrical recess 43 formed in the end thereof. No nibs, such as the nibs 24 described above, are provided on the half round end yoke 40. However, each of the opposed arms 42 terminates in a pair of threaded apertures 45. When the cross 31 is assembled with the half round end yoke 40, two opposed bearing caps 33 are received in the semicylindrical recesses 43, as shown in FIGS. 6 and 7.

A pair of modified retainer straps 46 are provided for retaining the opposed bearing caps 33 within the semi-cylindrical recesses 43 of the end yoke 40 and for preventing relative rotation therebetween. The central portions of the retainer straps 46 are curved and extend partially about the outer circumferential surfaces 34 of the opposed bearing caps 33. However, unlike the retainer straps 26 described above, each of the modified retainer straps 46 further includes a flange portion 46a which extends partially across the closed end surface 35 of the bearing cap 33 in a chord-like manner. As shown in FIG. 7, each of the flange portions 46a has a slot 46b formed in the underside thereof. The slots 46b are sized to receive one of the protrusions 36 of the bearing caps 33 therein, as will be described further below.

Each of the retainer straps 46 terminates in a pair of end portions having non-threaded apertures 47 formed therethrough. Threaded fasteners 48 extend through the non-threaded apertures 47 into engagement with the threaded apertures 45 to secure the retainer straps 46 to the opposed arms 42 of the half round end yoke 40. As a result, the opposed bearing caps 33 are retained within the semi-cylindrical recesses 33 of the half round end yoke 40. When the cross 31 is assembled with the half round end yoke 40 and the retainer strap 46 is secured thereto, the flange portion 46a of the retainer strap 46 extends inwardly over the end surface 35 to prevent the bearing cap 33 from moving axially relative to its associated trunnion 32. At the same time, one of the protrusions 36 is received within the slot 46b formed in the underside of the flange portion 46a. In this manner, the retainer straps 46 positively engage a protrusion 36 on each of the opposed bearing caps 33 so as to prevent rotation of the bearing caps 33 relative to the associated arms 42 of the end yoke 40.

Figures 8, 9:
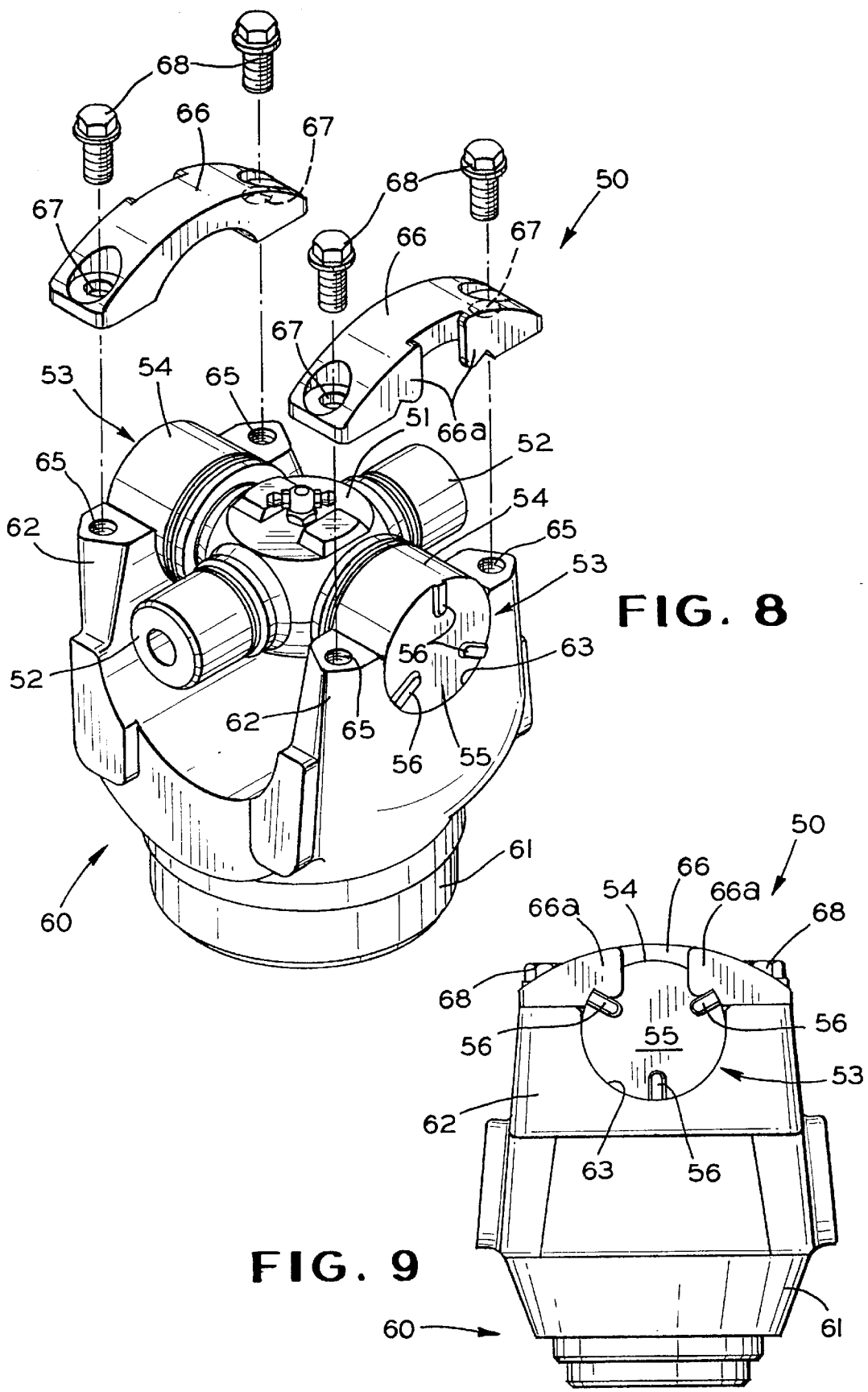
FIG. 8 is an exploded perspective view of a third embodiment of a universal joint assembly in accordance with this invention, including a half round end yoke having a pair of further modified retainer straps.
FIG. 9 is a top plan view of the universal joint assembly illustrated in FIG. 8 shown assembled.

Referring now to FIGS. 8 and 9, a third embodiment of a universal joint assembly, indicated generally at 50, in accordance with this invention is illustrated. The universal joint assembly 50 includes a conventional cross 51 having four cylindrical trunnions 52 extending radially outwardly in a common plane at right angles relative to one another. A bearing cap, indicated generally at 53, is mounted on the end of each of the trunnions 52. Only one opposed pair of the bearing caps 53 is illustrated in FIG. 8. Needle bearings (not shown) or similar bearing means are provided between each of the bearing caps 53 and its associated trunnion 52 to permit low friction rotational movement to occur therebetween. The bearing caps 53 are identical in structure to the bearing caps 13 described above, each including an outer circumferential surface 54, a closed end surface 55, and a plurality of axially extending protrusions 56.

The universal joint assembly 50 illustrated in FIGS. 8 and 9 further includes a half round end yoke, indicated generally at 60. The half round end yoke 60 includes a body portion 61 having a pair of opposed arms 62 extending therefrom. Each of the opposed arms 62 has a semi-cylindrical recess 63 formed in the end thereof. No nibs, such as the nibs 24 described above, are provided on the half round end yoke 60. However, each of the opposed arms 62 terminates in a pair of threaded apertures 65. When the cross 51 is assembled with the half round end yoke 60, two opposed bearing caps 53 are received in the semi-cylindrical recesses 63, as shown in FIGS. 8 and 9.

A pair of further modified retainer straps 66 are provided for retaining the opposed bearing caps 53 within the semi-cylindrical recesses 63 of the end yoke 60 and for preventing relative rotation therebetween. The central portions of the retainer straps 66 are curved and extend partially about the outer circumferential surfaces 54 of the opposed bearing caps 53. However, unlike the retainer straps 26 described above, each of the modified retainer straps 66 further includes a pair of flange portions 66a, each of which extends partially across the closed end surface 55 of the bearing cap 53. As shown in FIG. 9, the flange portions 66a define a gap therebetween, and two of the protrusions 56 of the bearing caps 53 are received in that gap, as will be described further below.

Each of the retainer straps 66 terminates in a pair of end portions having non-threaded apertures 67 formed therethrough. Threaded fasteners 68 extend through the non-threaded apertures 67 into engagement with the threaded apertures 65 to secure the retainer straps 66 to the opposed arms 62 of the half round end yoke 60. As a result, the opposed bearing caps 53 are retained within the semi-cylindrical recesses 53 of the half round end yoke 60. When the cross 51 is assembled with the half round end yoke 60 and the retainer strap 66 is secured thereto, the flange portions 66a of the retainer strap 66 extends inwardly over the end surface 55 of the bearing cap 53. At the same time, two of the protrusions 56 are received within the gap defined between the flange portions 66a. In this manner, the retainer straps 66 positively engage the protrusions 56 on each of the opposed bearing caps 53 so as to prevent rotation of the bearing caps 53 relative to the associated arms 62 of the end yoke 60. If desired, only one of the protrusions 56 may be trapped between the flange portions 66a to prevent relative rotation.

Figure 10:
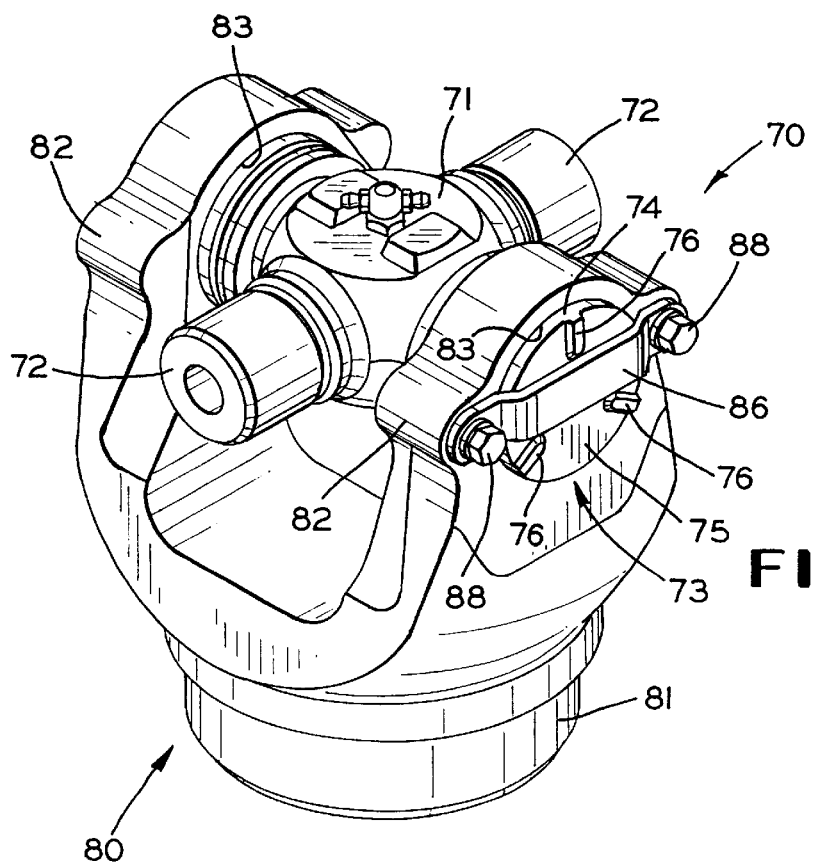
FIG. 10 is a perspective view of a fourth embodiment of a universal joint assembly in accordance with this invention, including a full round end yoke having a retainer strap.

Referring now to FIG. 10, a fourth embodiment of a universal joint assembly, indicated generally at 70, in accordance with this invention is illustrated. The universal joint assembly 70 includes a conventional cross 71 having four cylindrical trunnions 72 extending radially outwardly in a common plane at right angles relative to one another. A bearing cap, indicated generally at 73, is mounted on the end of each of the trunnions 72. Only one opposed pair of the bearing caps 73 is illustrated in FIG. 10. Needle bearings (not shown) or similar bearing means are provided between each of the bearing caps 73 and its associated trunnion 72 to permit low friction rotational movement to occur therebetween. The bearing caps 73 are identical in structure to the bearing caps 13 described above, each including an outer circumferential surface 74, a closed end surface 75, and a plurality of axially extending protrusions 76.

The universal joint assembly 70 illustrated in FIG. 10 further includes a full round end yoke, indicated generally at 80. The full round end yoke 80 includes a body portion 81 having a pair of opposed arms 82 extending therefrom. Each of the opposed arms 82 has a cylindrical opening 83 formed in the end thereof No nibs, such as the nibs 24 described above, are provided on the full round end yoke 80. However, each of the opposed arms 82 has a pair of threaded apertures (not shown) formed therein. When the cross 71 is assembled with the full round end yoke 80, two opposed bearing caps 73 are received in the cylindrical openings 83, as shown in FIG. 10.

A pair of retainer straps 86 are provided for retaining the opposed bearing caps 73 within the cylindrical openings 84 of the end yoke 80 and for preventing relative rotation therebetween. The retainer straps 86 are formed from a generally flat, relatively thin metallic strip having a pair of non-threaded openings (not shown) formed through the ends thereof Each of the retainer straps 86 terminates in a pair of end portions having non-threaded apertures (not shown) formed therethrough. Threaded fasteners 88 extend through the non-threaded apertures into engagement with the threaded apertures to secure the retainer straps 86 to the opposed arms 82 of the full round end yoke 80. As a result, the opposed bearing caps 73 are retained within the cylindrical openings 73 of the full round end yoke 80. When the cross 71 is assembled with the full round end yoke 80 and the retainer strap 86 is secured thereto, the central portion of the retainer strap 86 extends over the end surface 75 of the bearing cap 53. As shown in FIG. 10, each retainer strap 80 extends between the protrusions 76 of the bearing cap 73. In this manner, the retainer straps 86 positively engage the protrusions 76 on each of the opposed bearing caps 73 so as to prevent rotation of the bearing caps 73 relative to the associated arms 82 of the end yoke 80. The retainer straps 86 may, if desired, engage the radially innermost ends of one or more of the protrusions 76.

Figure 11:
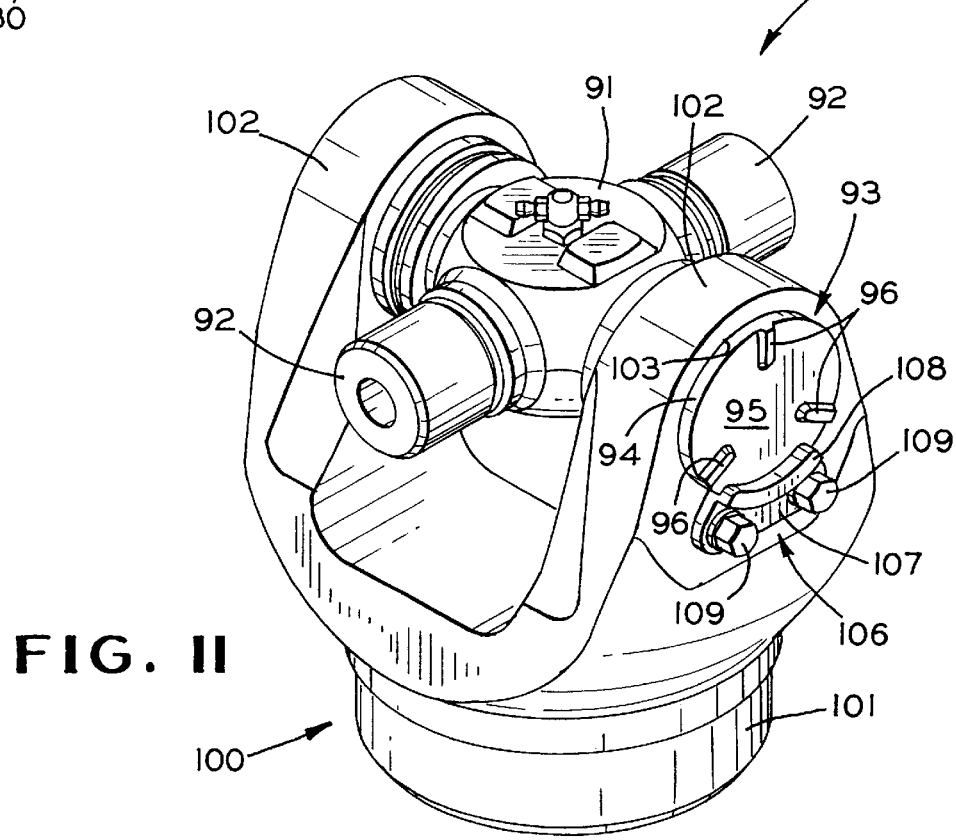
FIG. 11 is a perspective view of a fifth embodiment of a universal joint assembly in accordance with this invention, including a full round end yoke having a spring tab retainer strap.

Referring now to FIG. 11, a fifth embodiment of a universal joint assembly, indicated generally at 90, in accordance with this invention is illustrated. The universal joint assembly 90 includes a conventional cross 91 having four cylindrical trunnions 92 extending radially outwardly in a common plane at right angles relative to one another. A bearing cap, indicated generally at 93, is mounted on the end of each of the trunnions 92. Only one opposed pair of the bearing caps 93 is illustrated in FIG. 11. Needle bearings (not shown) or similar bearing means are provided between each of the bearing caps 93 and its associated trunnion 92 to permit low friction rotational movement to occur therebetween. The bearing caps 93 are identical in structure to the bearing caps 13 described above, each including an outer circumferential surface 94, a closed end surface 95, and a plurality of axially extending protrusions 96.

The universal joint assembly 90 illustrated in FIG. 11 further includes a full round end yoke, indicated generally at 100. The full round end yoke 100 includes a body portion 101 having a pair of opposed arms 102 extending therefrom. Each of the opposed arms 102 has a cylindrical opening 103 formed in the end thereof No nibs, such as the nibs 24 described above, are provided on the fill round end yoke 100. However, each of the opposed arms 102 has a pair of threaded apertures (not shown) formed therein. When the cross 91 is assembled with the fill round end yoke 100, two opposed bearing caps 93 are received in the cylindrical openings 103, as shown in FIG. 11.

A pair of retainer straps, one of which is indicated generally at 106, are provided for retaining the opposed bearing caps 93 within the cylindrical openings 103 of the full round end yoke 100 and for preventing relative rotation therebetween. The retainer straps 106 in this embodiment are formed as spring tabs. Each spring tab retainer strap 106 includes a base portion 107 and a flange portion 108. Each base portion 107 has a pair of non-threaded apertures (not shown) formed therethrough. Threaded fasteners 109 extend through the non-threaded apertures into engagement with the threaded apertures of the opposed arms 102 of the full round end yoke 100. The flange portions 108 of the spring tab retainer straps 106 extend inwardly over the end surfaces 95 of the bearing caps 93 between the protrusions 96. This engagement of the spring tab retainer straps 106 with the protrusions 96 on the opposed bearing caps 93 prevents rotation of the bearing caps 93 relative to the full round end yoke 100.

Figure 12:
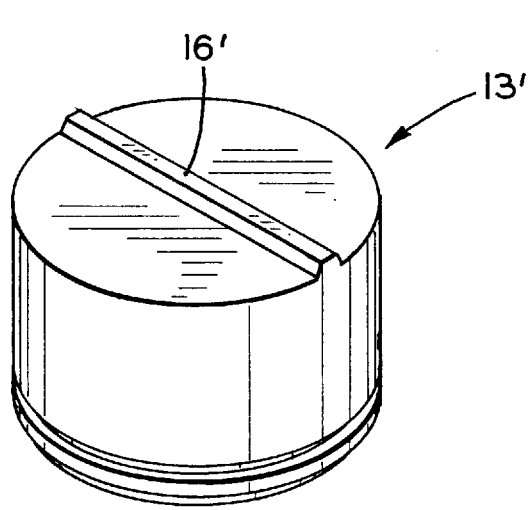
FIGS. 12 through 14 are perspective views of alternate embodiments of the bearing cap illustrated in FIGS. 1 through 11.
Figure 13:
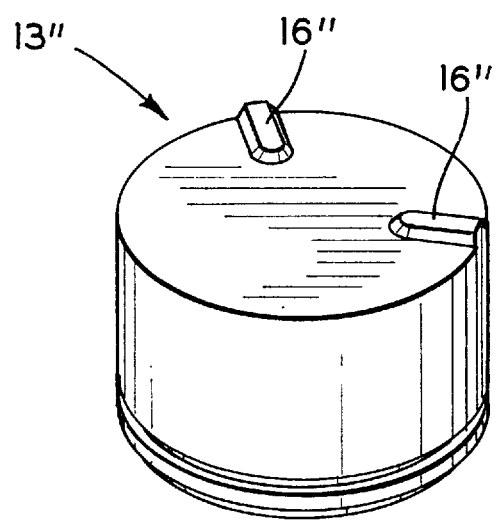
Figure 14:
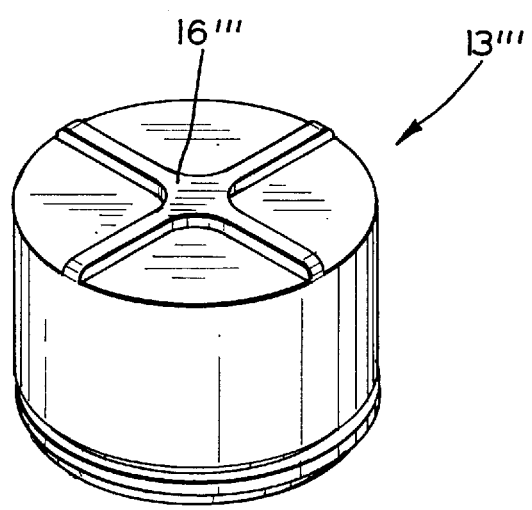

FIGS. 12 through 14 show alternate embodiments of the bearing cap 13 of FIGS. 1 through 11. These alternate embodiments illustrate that the protrusions 16 on the end surfaces 15 of the bearing caps 13 can vary in size, spacing, and number. FIG. 12 shows a bearing cap 13' including a single protrusion 16' which extends completely across the end surface thereof. FIG. 13 shows a bearing cap 13" including two protrusions 16'. FIG. 14 shows a bearing cap 13''' including a single protrusion 16''' in the shape of a cross which extends completely across the end surface thereof. Thus, it will be appreciated that the size, spacing, and number of the protrusions 16 may vary.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A universal joint assembly comprising:
   a yoke including an arm having a recess formed therein;
   a cross having an outwardly extending trunnion;
   a bearing cap rotatably mounted on said trunnion, said bearing cap including an outer circumferential surface and an end surface, wherein a portion of said outer circumferential surface engages said recess formed in said yoke arm, said end surface having at least one axially extending protrusion provided thereon; and
   a retainer strap removably secured to said yoke arm for retaining said bearing cap within said recess, said retainer strap including a slot which receives said protrusion of said bearing cap to prevent rotation of said bearing cap relative to said yoke arm.

2. The universal joint assembly defined in claim 1 wherein said retainer strap includes a curved central portion extending partially about said outer circumferential surface of said bearing cap and terminating in opposite end portions.

3. The universal joint assembly defined in claim 2 wherein said retainer strap includes means to prevent said bearing cap from moving axially relative to said trunnion.

4. The universal joint assembly defined in claim 3 wherein said means to prevent said bearing cap from moving axially includes a flange formed along said central portion and extending partially across said end surface of said bearing cap in a chord-like manner.

5. The universal joint assembly defined in claim 4 wherein said slot of said retainer strap is formed in said flange.

6. The universal joint assembly defined in claim 5 wherein said slot is formed in an underside of said flange sized to receive said protrusion.

7. A universal joint assembly comprising:
   a yoke including an arm having a recess formed therein;
   a cross having an outwardly extending trunnion;
   a bearing cap rotatably mounted on said trunnion, said bearing cap including an outer circumferential surface, an end surface, and means protruding axially from said end surface away from said trunnion; and
   a retainer strap secured to said yoke arm and extending about a portion of said outer circumferential surface of said bearing cap to retain said outer circumferential surface in engagement with said recess of said arm, said retainer strap including slot means to receive said protrusion means of said bearing cap to prevent rotation of said bearing cap relative to said yoke arm.

8. The universal joint assembly defined in claim 7 wherein said retainer strap includes means to prevent said bearing cap from moving axially relative to said trunnion.

9. The universal joint assembly defined in claim 8 wherein said means to prevent said bearing cap from moving axially includes a flange formed on said retainer strap extending partially across said end surface of said bearing cap.

10. The universal joint assembly defined in claim 9 wherein said slot means of said retainer strap is formed in said flange.

11. The universal joint assembly defined in claim 10 wherein said slot means includes a slot formed in an underside of said flange sized to receive said protrusion means.

12. A retainer strap adapted to be secured to a yoke and retain a bearing cap including an outer circumferential surface and an end surface having a protrusion in a universal joint assembly, said retainer strap comprising:
    a central portion including a curved surface adapted to extend about a portion of the outer circumferential surface of the bearing cap, said central portion terminating in opposed end portions; and
    a flange extending in a chord-like manner along said central portion and adapted to engage the end surface of the bearing cap, said flange having a slot formed therein adapted to receive the protrusion formed on the bearing cap.

13. The retainer strap defined in claim 12 wherein said slot is sized to receive the protrusion of the bearing cap to prevent rotation of the bearing cap relative to the yoke.

14. The retainer strap defined in claim 12 wherein each of said end portions includes an aperture.

* * * * *